United States Patent

[11] 3,583,198

[72] Inventor Merrill E. Drallmeier
 Detroit, Mich.
[21] Appl. No. 830,710
[22] Filed June 5, 1969
[45] Patented June 8, 1971
[73] Assignee Ford Motor Company
 Dearborn, Mich.

[54] LATERAL EXTRUSION PROCESS
 3 Claims, 4 Drawing Figs.
[52] U.S. Cl................................................ 72/358,
 72/374
[51] Int. Cl...................................................... B21d 22/00,
 B21d 31/00
[50] Field of Search............................................ 72/260,
 253, 358; 18/DIG.26, 42 M; 249/63, 64, 142, 160;
 164/313, 137, 342

[56] References Cited
 UNITED STATES PATENTS
 3,231,477 1/1966 Saunders........................ 72/260
 3,286,502 11/1966 Cogan............................ 72/260
 1,296,588 3/1919 Bamberg........................ 164/342X
 3,384,926 5/1968 Tsujii............................. 18/
 3,038,220 6/1962 Saives............................ 164/313
 2,521,520 9/1950 Jancura.......................... 164/342X
 FOREIGN PATENTS
 947,878 9/1961 Great Britain................. 164/342

Primary Examiner—Charles W. Lanham
Assistant Examiner—Robert M. Rogers
Attorneys—Rohn R. Faulkner and Blenn S. Arendsen ABSTRACT: The spider of a universal joint is formed from a cylindrical steel slug into die portions having internal cavities corresponding to the size and shape of the arms of the spider. Grease holes are back extruded simultaneously into the ends of the arms by members having a substantially blunt inner surface projecting into the cavities parallel to and substantially on the axes of the corresponding arms. After extrusion the die portions are moved outward in a direction parallel to the axes of the corresponding arms and the spider is removed from the press.

PATENTED JUN 8 1971

INVENTOR
MERRILL E. DRALLMEIER

BY John R. Faulkner
Glenn S. Arendsen
ATTORNEYS

3,583,198

LATERAL EXTRUSION PROCESS

SUMMARY OF THE INVENTION

Spiders for universal joints used in automotive drive shafts for example traditionally have been formed by a hot forging process. After forging, considerable machining and grinding was required to attain the necessary size, shape and surface finish of the trunnions. In recent years several attempts have been made to manufacture the spiders by less expensive techniques, one of which was a process that included welding spider elements together. While some of these techniques have achieved a reasonable degree of commercial success, none has resulted in a process for producing high quality spiders without necessitating large amounts of machining and grinding.

This invention provides a process for producing an integral spider by laterally extruding the metal of the spider into die portions having internal cavities corresponding to the desired shape of each spider arm. In carrying out the process, the cylinder of the metal is located in a die assembly made up of die portions corresponding in number to the arms of the spider. Each die portion has an internal cavity corresponding to the desired shape of a spider arm. The die portions are closed around the metal cylinder and a high compressive force is applied to the cylinder to extrude the metal laterally into the die portions. After extrusion the die portions move radially outward parallel to the axes of the arms of the spider, and the spider is removed from the extrusion press.

The resulting spider requires only minor machining to remove any flash formed by the mating surfaces of the die portions. Any flash is formed at a location between the spider arms rather than on the arms. Bearing surfaces of the spider arms generally need no machining or grinding. Grease holes in the ends of the trunnions can be back extruded simultaneously by locating a projecting pin or member having a substantially blunt inner surface in each die cavity. During extrusion, metal flowing into the cavities flows around the pins to form the trunnion ends. When the die portions and pins are withdrawn from the spider arms, the pins leave a well-defined grease hole in the end of the trunnion. A lubricant such as zinc phosphate typically is applied to the metal cylinder prior to extrusion. Extrusion can be carried out either at room temperature or the metal cylinder can be heated to as high as 1,400° F. to reduce the required extrusion forces. The die portions are locked in place during extrusion by a set of locking wedges that lead the compressive stroke of the extrusion press.

DETAILED DESCRIPTION

Figure 1:
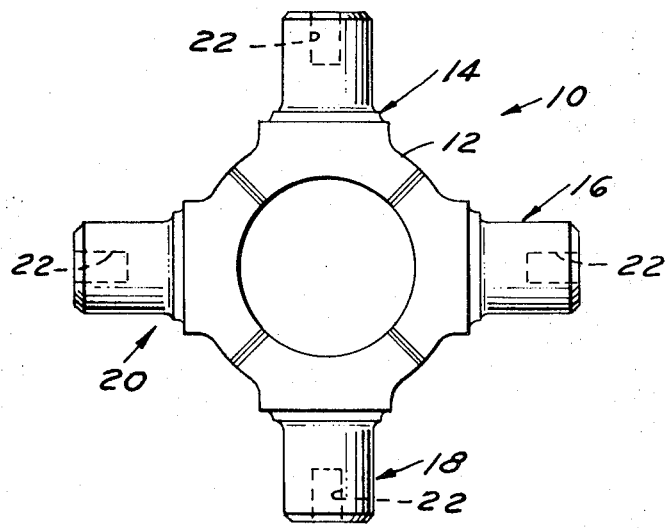
FIG. 1 is a plan view of a spider made according to the process of this invention showing the location of the flash lines between the trunnions.

Referring to FIG. 1, a spider made according to the process of this invention is indicated by numeral 10. Spider 10 comprises a substantially cylindrical central portion 12 having four equally spaced projecting arms 14, 16, 18 and 20 at right angles to each other. The radially outer portions of arms 14—20 have a reduced diameter with a smooth cylindrical shape and are generally referred to as trunnions. A small grease hole 22 is formed in the end of each trunnion on the approximate centerline of the axis of each arm.

Figure 2:
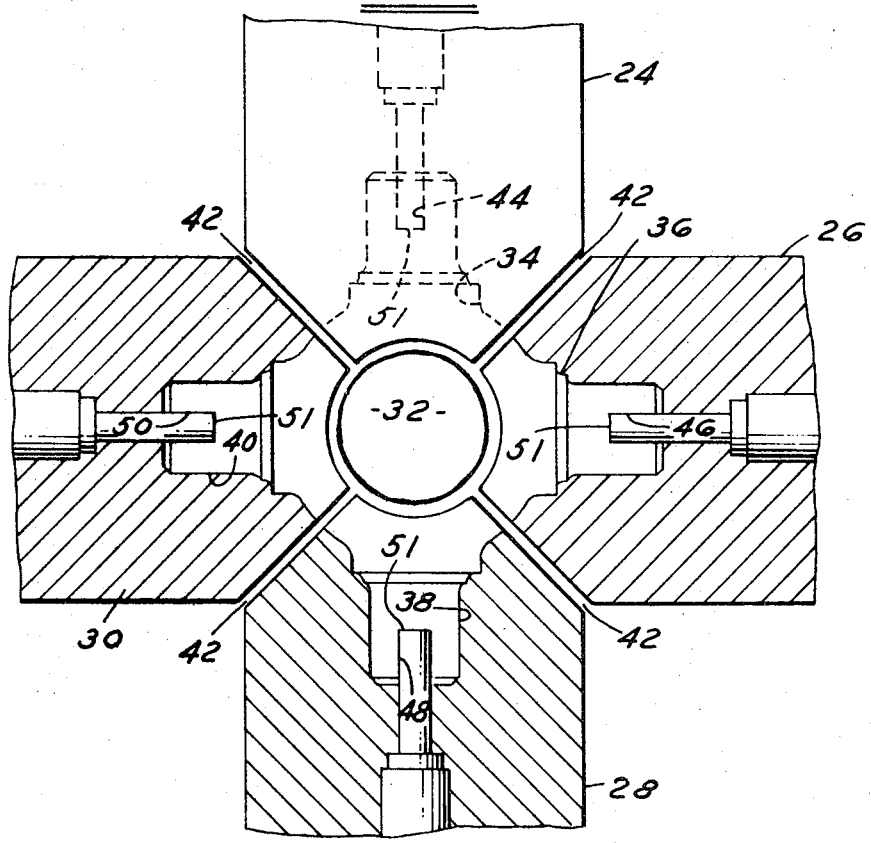
FIG. 2 is a partial plan view showing the relative positions of the four die portions around the metal cylinder prior to extrusion. The figure also shows the pins projecting into the die cavities to back extrude the grease holes.

Turning to FIG. 2, four die portions 24, 26, 28 and 30 are positioned around a metal cylinder 32 in a press (not shown). Each die portion contains an internal cavity 34, 36, 38 and 40 corresponding in size and shape to the desired arms 14—20. The inner sides of the die portions are mitered as at 42 so the die portions fit tightly around cylinder 32 when in the extruding position. Short pins 44, 46, 48 and 50 project into the cavities 34—40 from the outer end thereof. Each of the pins 44—50 has a blunt inner surface 51. In some cases, surface 51 can have a bullet-nosed configuration, but the radius of the surface should be at least about six times the diameter of the pin. Best extrusion characteristics and part formation is obtained with pin surfaces having radii greater than nine times the pin diameter.

Figure 3:
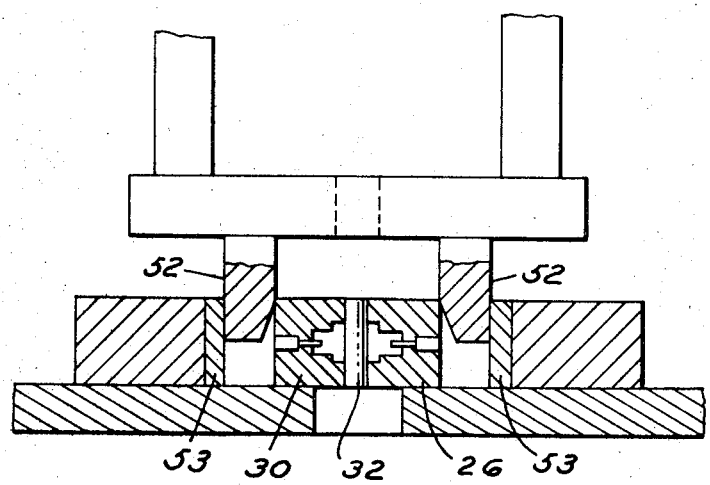
FIG. 3 is a sectional view through the die portions showing the locking wedges that restrain lateral movement of the die portions during extrusion.
Figure 4:
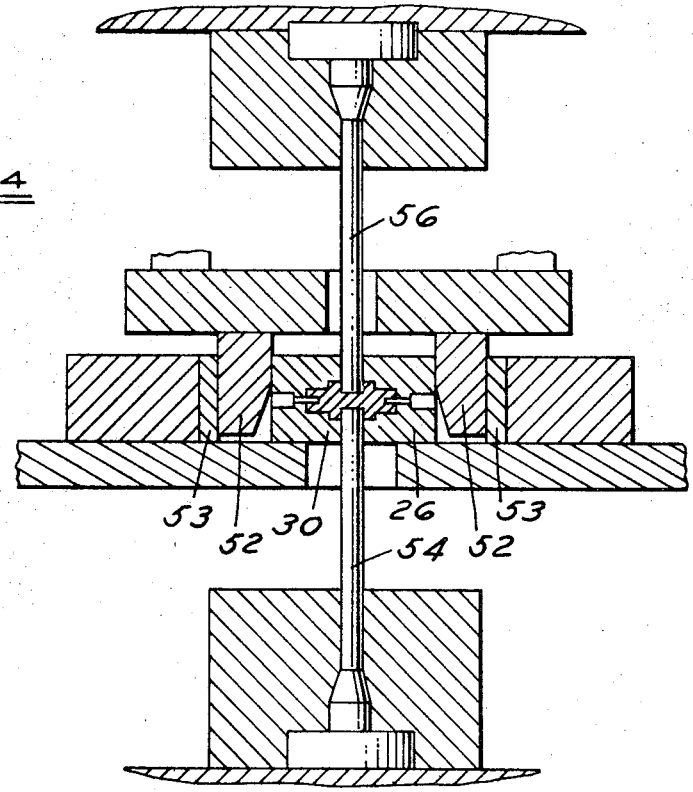
FIG. 4 is a sectional view through an extrusion press showing the positions of the locking wedges and the rams that apply the compressive forces to the metal cylinder during extrusion.

As shown in FIGS. 3 and 4, a plurality of locking pins 52 are moved into positions behind the die portions to prevent lateral movement of the die portions during extrusion. The outer surfaces of the locking pins bear against wear members 53. A pedestal 54 is positioned under cylinder 32 and a ram 56 capable of applying a relatively high amount of compressive force is positioned above the cylinder. After the locking pins are in place, ram 56 is moved into cylinder 32. Ram 56 typically applies about 40 tons of compressive force to cylinder 32.

Under this high compressive force, the metal of cylinder 32 extrudes into cavities 34—40 and around the projecting pins 44—50. After extrusion, the locking pins 52 are withdrawn and the die portions are moved laterally outward parallel to and substantially on the axes of the corresponding arms of the spider. The spider is then removed from the press and any flash formed at the parting lines of the die portions, which is on cylindrical portion 12, is machined away.

A.I.S.I. 5115 hot-rolled steel typically is used in the process. The steel is formed into cylinders approximately 1¼—1½ inches in diameter that have a hardness of about 75—90 Rockwell B. A multiple station extrusion press can be used if desired.

Highly accurate trunnions and grease holes are formed by maintaining the ends of pins 44—50 relatively blunt as shown. Tapered pin ends generally produce unsatisfactory metal flow in the process. Bullet nosed pins having curved but relatively blunt ends can be used with reasonably satisfactory results.

Thus this invention provides a process for laterally extruding a spider for a universal joint in a single operation. Grease holes are back extruded simultaneously by means of pins projecting into die cavities used to form the spider arms.

I claim:

1. A process for producing an integral metal member having a cross construction made up of a plurality of projecting arms comprising preparing a cylinder of the metal, locating said cylinder in a die assembly made up of die portions corresponding in number to the arms of said cross construction, each of said die portions having internal cavities corresponding to the desired shape of an arm of said cross construction, locating members that project into each die portion cavity parallel to and substantially on the axis of the cavity, said members having a relatively blunt inner surface, exerting a compressive force on the metal cylinder to laterally extrude the metal into each of said cavities and around said projecting members substantially simultaneously, and removing at least part of the compressive force and moving the die portions outward in a direction substantially parallel to the axes of the die portion cavities and projecting members while maintaining the cross construction stationary, said projecting members forming holes in the ends of the arms of the cross construction.

2. The process of claim 1 in which the metal member is a spider for a universal joint, said spider having four substantially identical arms positioned at right angles to each other.

3. The process of claim 2 in which the inner surfaces of the members projecting into the die portions cavities have a bullet-nose shape, the radius of said bullet nose of each member being at least six times the diameter of the members